United States Patent
Kikushima et al.

(10) Patent No.: US 11,030,399 B2
(45) Date of Patent: Jun. 8, 2021

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventors: Kosuke Kikushima, Kanagawa (JP); Atsushi Maruyama, Kanagawa (JP); Taro Yoshihama, Kanagawa (JP); Naoto Kashiwagi, Kanagawa (JP); Yohei Uchiumi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 252 days.

(21) Appl. No.: 16/159,275

(22) Filed: Oct. 12, 2018

(65) Prior Publication Data

US 2019/0129977 A1 May 2, 2019

(30) Foreign Application Priority Data

Oct. 27, 2017 (JP) .............................. JP2017-208259

(51) Int. Cl.

| | |
|---|---|
| *G06F 40/197* | (2020.01) |
| *G06F 3/0486* | (2013.01) |
| *G06F 3/0483* | (2013.01) |
| *G06F 40/106* | (2020.01) |
| *G06F 40/103* | (2020.01) |

(Continued)

(52) U.S. Cl.
CPC .......... *G06F 40/197* (2020.01); *G06F 3/0483* (2013.01); *G06F 3/0486* (2013.01); *G06F 40/103* (2020.01); *G06F 40/106* (2020.01); *G06F 3/0485* (2013.01); *G06F 16/178* (2019.01); *G06F 2203/04806* (2013.01)

(58) Field of Classification Search
CPC .... G06F 40/197; G06F 40/103; G06F 40/106; G06F 3/0483; G06F 3/0486; G06F 3/0485; G06F 16/178; G06F 2203/04806
See application file for complete search history.

(56) References Cited

U.S. PATENT DOCUMENTS

| | | | |
|---|---|---|---|
| 6,072,461 A * | 6/2000 | Haran | G06F 3/04895 345/157 |
| 6,560,620 B1 * | 5/2003 | Ching | G06F 40/20 715/229 |

(Continued)

FOREIGN PATENT DOCUMENTS

JP   2009-169545 A   7/2009

*Primary Examiner* — Tadesse Hailu
(74) *Attorney, Agent, or Firm* — Oliff PLC

(57) ABSTRACT

An information processing apparatus includes a display, a setter, and a synchronization controller. The display displays a first document in a first window and also displays a second document in a second window. The setter sets a synchronization setting between the first and second documents. The synchronization controller executes an operation performed on one of the first and second documents also on the other one of the first and second documents when a synchronization setting is set by the setter, and cancels the synchronization setting when one of the first and second documents is in a first state in which it is not being used and restarts the synchronization setting when the corresponding one of the first and second documents is changed from the first state to a second state in which it is being used.

11 Claims, 14 Drawing Sheets

(51) Int. Cl.
*G06F 3/0485* (2013.01)
*G06F 16/178* (2019.01)

(56) References Cited

U.S. PATENT DOCUMENTS

| | | | | |
|---|---|---|---|---|
| 8,131,670 B2* | 3/2012 | i Dalfo | | G06F 16/273 707/610 |
| 8,825,758 B2* | 9/2014 | Bailor | | G06F 21/31 709/204 |
| 8,890,887 B2* | 11/2014 | Lethers | | G16H 30/40 345/618 |
| 9,792,266 B1* | 10/2017 | Armstrong | | G06F 40/103 |
| 2003/0095697 A1* | 5/2003 | Wood | | A61B 6/037 382/131 |
| 2006/0136828 A1* | 6/2006 | Asano | | G06F 9/54 715/733 |
| 2006/0294418 A1* | 12/2006 | Fuchs | | G06Q 10/10 714/11 |
| 2007/0126677 A1* | 6/2007 | Lee | | G09G 3/3607 345/88 |
| 2008/0168151 A1* | 7/2008 | Fuchs | | G06Q 10/10 709/208 |
| 2010/0153483 A1* | 6/2010 | Offermann | | G06F 9/451 709/203 |
| 2013/0198692 A1* | 8/2013 | Lin | | G06F 3/0483 715/835 |
| 2014/0282213 A1* | 9/2014 | Musa | | G06F 3/0481 715/781 |
| 2015/0106330 A1* | 4/2015 | Giampaolo | | G06F 16/178 707/634 |
| 2015/0169614 A1* | 6/2015 | Murali-Venkataraman | | G06F 16/1873 707/634 |
| 2015/0199113 A1* | 7/2015 | Prabhat | | G06F 3/0484 715/798 |
| 2016/0055196 A1* | 2/2016 | Collins | | G06F 40/197 707/690 |
| 2016/0212379 A1* | 7/2016 | Ito | | H04L 65/4015 |
| 2017/0060812 A1* | 3/2017 | Williams | | G06F 40/106 |

* cited by examiner

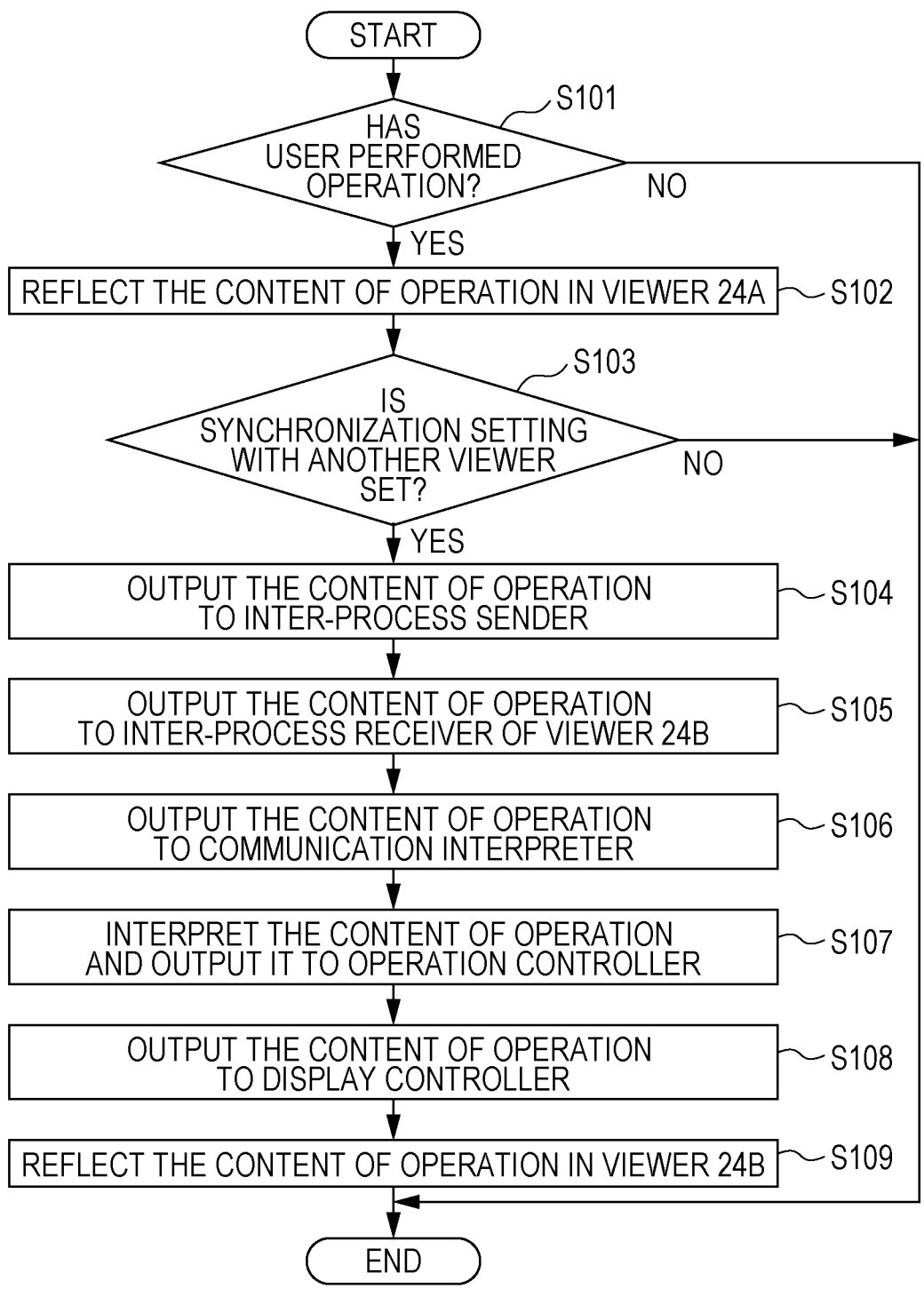

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-208259 filed Oct. 27, 2017.

BACKGROUND

(i) Technical Field

The present invention relates to an information processing apparatus and a non-transitory computer readable medium.

(ii) Related Art

Multi-window processing is known for displaying multiple windows on a screen of a computer, for example, and executing operation in each of the multiple windows.

SUMMARY

According to an aspect of the invention, there is provided an information processing apparatus including a display, a setter, and a synchronization controller. The display displays a first document in a first window and also displays a second document in a second window. The setter sets a synchronization setting between the first and second documents. The synchronization controller executes an operation performed on one of the first and second documents also on the other one of the first and second documents when a synchronization setting is set by the setter, and cancels the synchronization setting when one of the first and second documents is in a first state in which it is not being used and restarts the synchronization setting when the corresponding one of the first and second documents is changed from the first state to a second state in which it is being used.

BRIEF DESCRIPTION OF THE DRAWINGS

An exemplary embodiment of the present invention will be described in detail based on the following figures, wherein:

FIG. 8 is a flowchart illustrating processing which forms the basis of the exemplary embodiment;

DETAILED DESCRIPTION

An exemplary embodiment of the invention will be described below with reference to the accompanying drawings.

Exemplary Embodiment

1. Configuration
1.1 Overall Configuration

Figure 1:
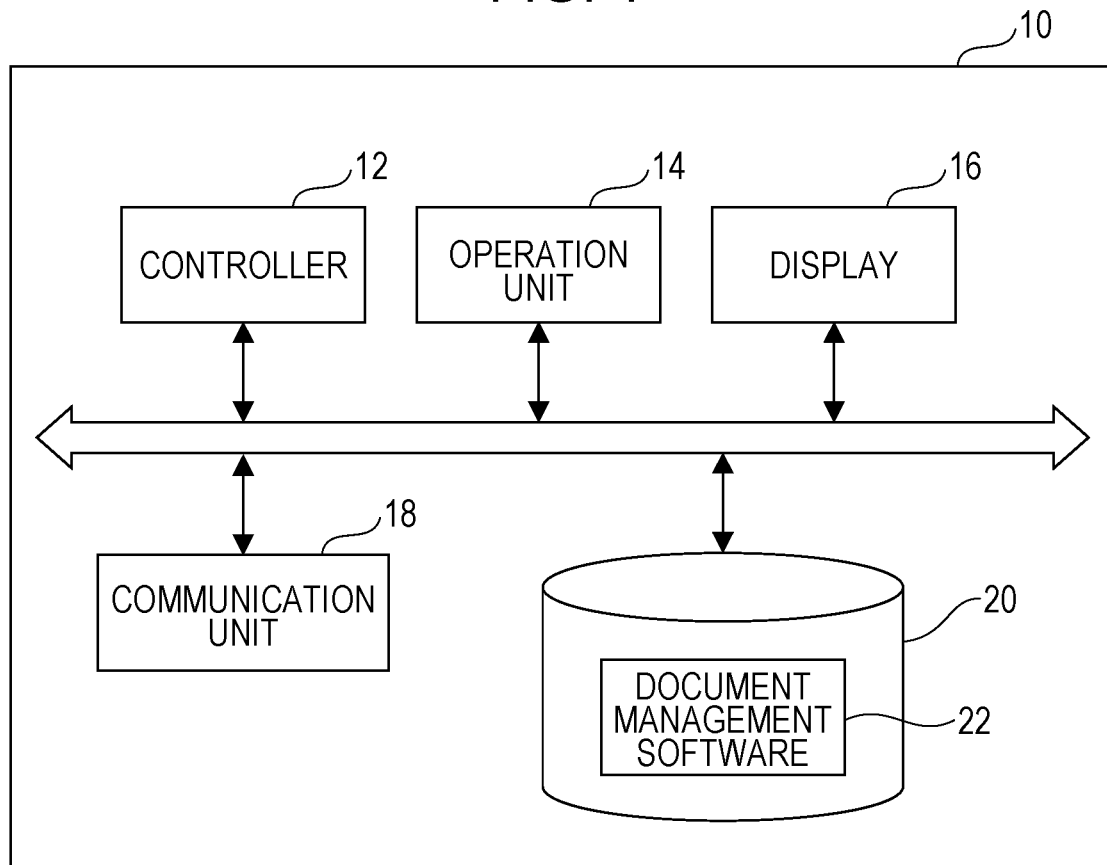
FIG. 1 is a block diagram illustrating the configuration of an information processing apparatus according to the exemplary embodiment.

FIG. 1 is a block diagram illustrating the configuration of an information processing apparatus 10 according to the exemplary embodiment. Examples of the information processing apparatus 10 are a personal computer (PC), a smartphone, and a tablet terminal.

The information processing apparatus 10 includes a controller 12, an operation unit 14, a display 16, a communication unit 18, and a storage 20.

The controller 12 includes one or plural central processing units (CPUs), a read only memory (ROM), and a random access memory (RAM). The CPU or the CPUs load a program from the ROM or the storage 20 to the RAM and execute it.

The operation unit 14 is a keyboard and a mouse or a touchscreen, for example. A user performs operation by using the operation unit 14 and inputs information.

The display 16 is a liquid crystal display (LCD) or an organic electroluminescence (EL) display, for example, and displays various items of information in response to an instruction from the controller 12.

The communication unit 18 sends and receives data to and from an external server via a communication network, such as the Internet or a local area network (LAN).

The storage 20 is a storage device, such as a flash memory, a hard disk drive (HDD), or a solid-state drive (SSD). The storage 20 may be a storage device which is removable from the information processing apparatus 10, such as a memory card. The storage 20 stores document management software 22, such as DocuWorks (registered trademark). The document management software 22 may be stored in the storage 20 as a result of being stored in a storage medium, such as a digital versatile disc (DVD)-ROM, or being downloaded from an external server by using the communication unit 18.

The CPU or the CPUs of the controller 12 execute various document management operations by reading the document management software 22 from the storage 20 and by executing it. More specifically, the controller 12 first displays a digital desk on the display 16, and then displays and arranges documents (paper documents and digital documents) on the digital desk and executes viewing and editing on the documents. When a user selects a desired document from the documents displayed on the digital desk, the controller 12 displays the selected document by using a display module (viewer) 24 included in the document management software 22 on the display 16. The viewer 24 includes various tools for allowing a user to view and edit a document page by page.

1.2 Configuration of Display Module (Viewer)

Figure 2:
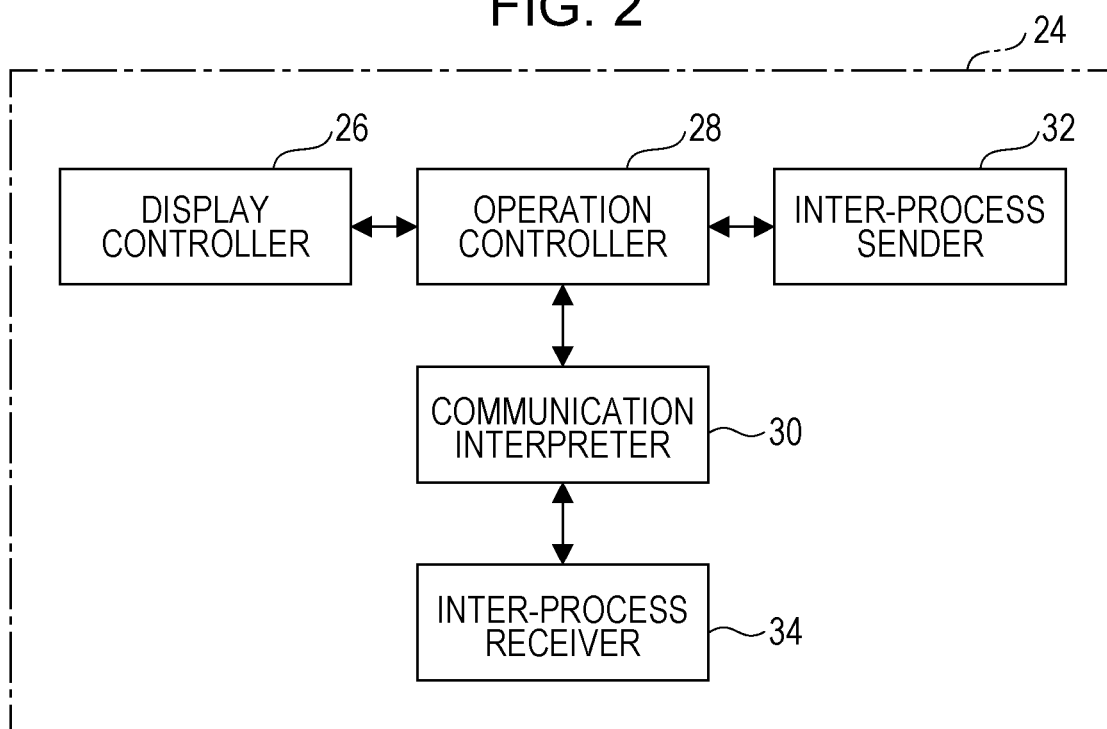
FIG. 2 is a functional block diagram of a display module (viewer)

FIG. 2 is a functional block diagram of the display module (viewer) 24. The viewer 24 includes a display controller 26, an operation controller 28, a communication interpreter 30, an inter-process sender 32, and an inter-process receiver 34. These functional blocks are implemented as a result of the CPU or the plural CPUs of the controller 12 executing a processing program. However, some of the functional blocks may be implemented by hardware processing, instead of executing software processing using the processing program. The hardware processing may be executed by using a circuit, such as an application specific integrated circuit (ASIC) or a field programmable gate array (EPGA).

The display controller 26, which serves as a display and a setter, controls a user interface of the display 16, and more specifically, a display mode of documents on the display 16.

The operation controller 28, which serves as a synchronization controller, detects user operation performed by using the operation unit 14. The operation controller 28 outputs an instruction based on the content of user operation to the display controller 26. The operation controller 28 also outputs an instruction based on the content of operation interpreted by the communication interpreter 30 to the display controller 26. When a specific condition is satisfied, the operation controller 28 outputs the content of operation to the inter-process sender 32. The specific condition is a condition that a synchronization setting with another viewer has been set. When another specific condition is satisfied, the operation controller 28 cancels a synchronization setting set with another viewer. This specific condition is a condition that one of multiple viewers is in a state in which it is not being used. However, after this specific condition is satisfied, if the state of this viewer is changed to a state in which it is being used again, the operation controller 28 restarts the synchronization setting with this viewer.

The communication interpreter 30 interprets the content of operation received by the inter-process receiver 34, and outputs the interpreted content to the operation controller 28.

The inter-process sender 32, which serves as the synchronization controller, outputs the content of operation received from the operation controller 28 to the inter-process receiver 34 of another viewer.

The inter-process receiver 34, which serves as the synchronization controller, receives the content of operation from the inter-process sender 32 of another viewer and outputs it to the communication interpreter 30.

Figure 3:
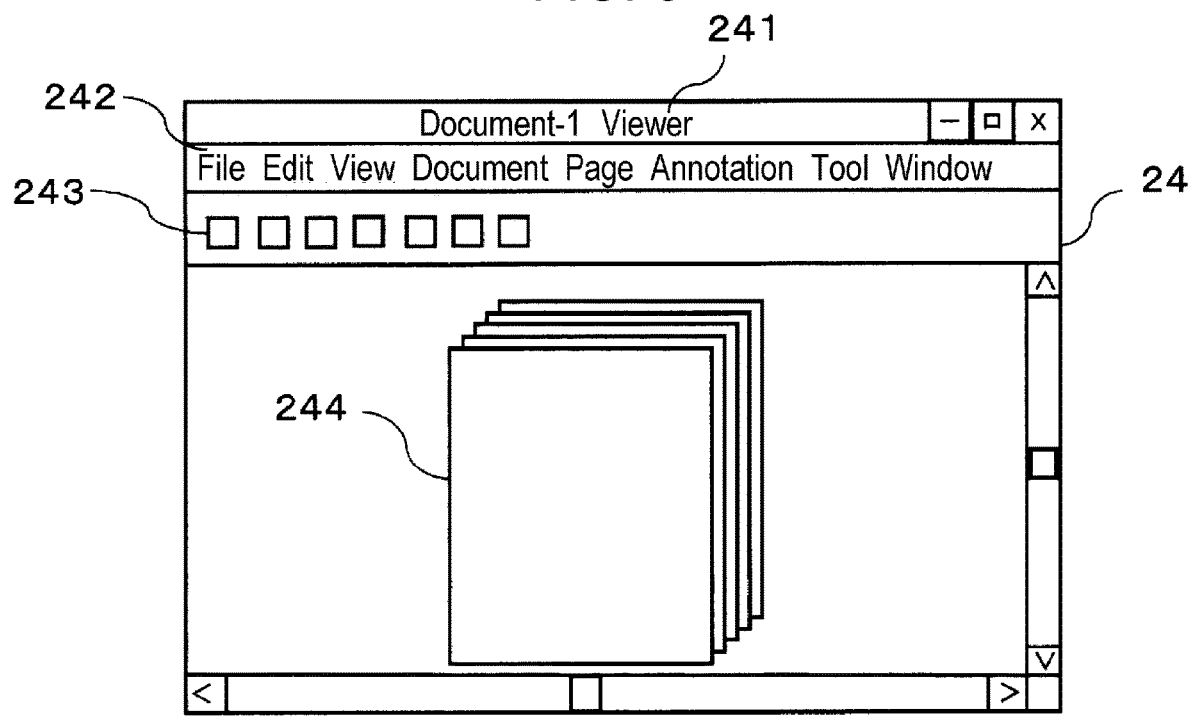
FIG. 3 illustrates a display example of a viewer.

FIG. 3 illustrates an example of a document displayed on the display 16 by the viewer 24. The viewer 24 functions as one window. At a predetermined position, such as the top portion of the viewer 24, a document name (document-1) 241 of a currently displayed document, is displayed, and under the top portion, an operation menu 242 is displayed. The operation menu 242 includes menu items, such as file, edit, view, document, page, annotation, tool, and window. Under the operation menu 242, icons 243 used for performing various operations are displayed. Under the icons 243, a display area for displaying a document is provided. In the display area, a document 244 is displayed in a perspective display mode to indicate how thick the document 244 is.

Advantages of displaying the document 244 in the perspective display mode are: a user can intuitively figure out how many pages the document 244 has, easily select a desired page, and easily identify an annotation (note) attached to a specific page.

Instead of in the perspective display mode, the viewer 24 may display the document 244 in a continuous display mode in which the pages of the document 244 are displayed continuously. A user may choose in which one of the modes the document 244 will be displayed.

The viewer 24 is opened for each document, and multiple viewers 24, that is, multiple windows (multi-window), are opened at the same time so that plural documents can be displayed together.

Figure 4:
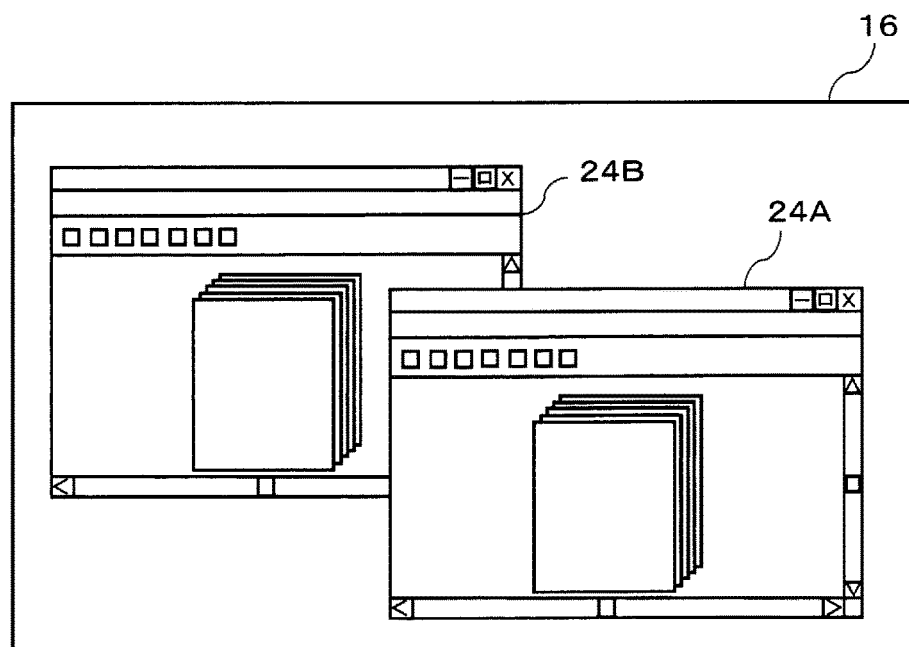
FIG. 4 illustrates a display example of multiple viewers.

FIG. 4 illustrates a state in which two documents are displayed at the same time on the display 16 as a result of opening two viewers 24. Viewers 24A and 24B are opened as the viewers 24, and different documents are displayed in the perspective display mode. The viewer 24A serves as a first window, while the viewer 24B serves as a second window.

The viewers 24A and 24B can be operated independently of each other. A user can make the viewer 24A or 24B active by selecting it with a mouse, for example, so as to perform a desired operation, such as scroll, zoom-in or zoom-out, copy, paste, cut, and delete operations, on the document displayed by the active viewer 24. These operations performed by using the active viewer 24 do not whatsoever influence the other viewer 24, that is, the non-active viewer. For example, a user makes the viewer 24A active and scrolls through the document displayed by the viewer 24A, and this scroll operation does not whatsoever influence the non-active viewer 24B.

On the other hand, however, some users may wish to synchronize the document displayed by the viewer 24A with that by the viewer 24B and to reflect the operation performed on one document in the other document. For example, two documents of different versions are displayed by the viewers 24A and 24B, and when a user scrolls through the document of a new version, this scroll operation is reflected in the document of an old version. This can save the user the trouble of scrolling through the corresponding page of the document of the old version separately. This may be very convenient for the user when checking two documents against each other.

As the basis forming the exemplary embodiment, the two viewers 24A and 24B are operated independently of each other in a default state, but they can be operated in synchronization with each other in response to an instruction from a user.

Hereinafter, synchronize processing as the basis forming the exemplary embodiment will be discussed below.

Figure 5:
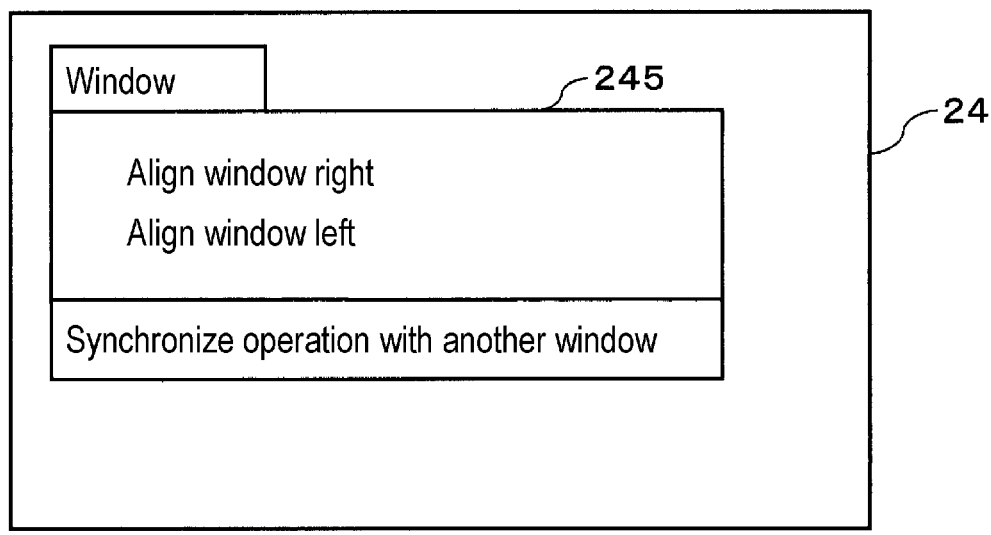
FIGS. 5 and 6 illustrate examples of synchronization setting screens.
Figure 6:
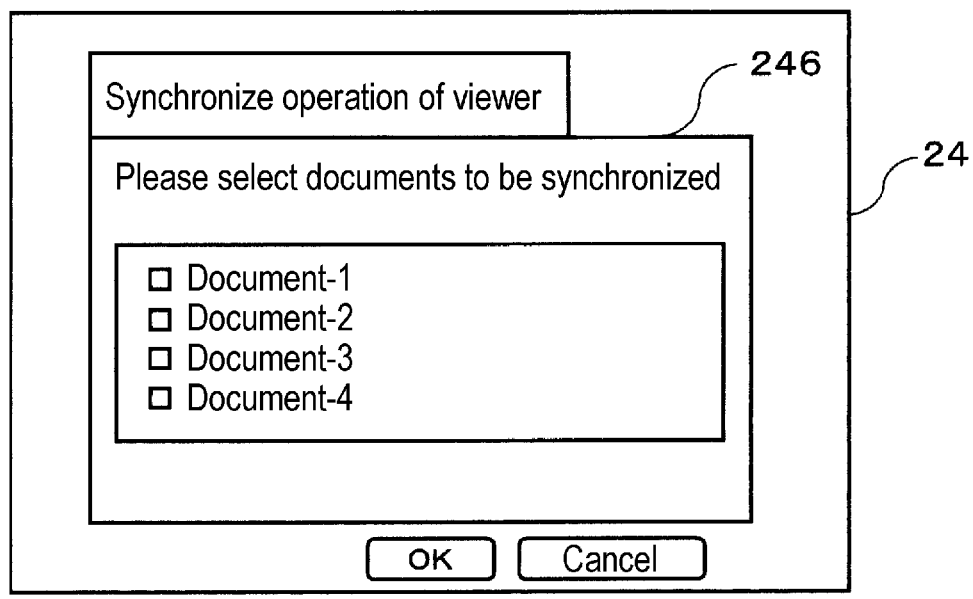

FIGS. 5 and 6 illustrate examples of setting screens for synchronizing operations of the viewers 24 with each other. These setting screens are displayed by the display controller 26. When a user selects "Window" from the operation menu 242 shown in FIG. 3, a window operation menu 245 is displayed. In FIG. 5, the window operation menu 245 includes menu items "Align window right", "Align window left", and "Synchronize operation with another window". If the user wishes to synchronize operations of multiple viewers 24 with each other, the user selects "Synchronize operation with another window".

FIG. 6 illustrates a setting screen when "Synchronize operation with another window" is selected. The screen for setting documents for which operations of the viewers 24 are synchronized with each other is displayed. A list of document names displayed by viewers 24 to be synchronized with each other is displayed. In FIG. 6, "document-1", "document-2", "document-3", and "document-4" are displayed. If the user wishes to synchronize the document-1 and the document-2 with each other, the user can select them by checking the corresponding check boxes.

It is now assumed that the document-1 is displayed by the viewer 24A, while the document-2 is displayed by the viewer 24B, and the user sets a setting for synchronizing the document-1 and the document-2 with each other.

Figure 7:
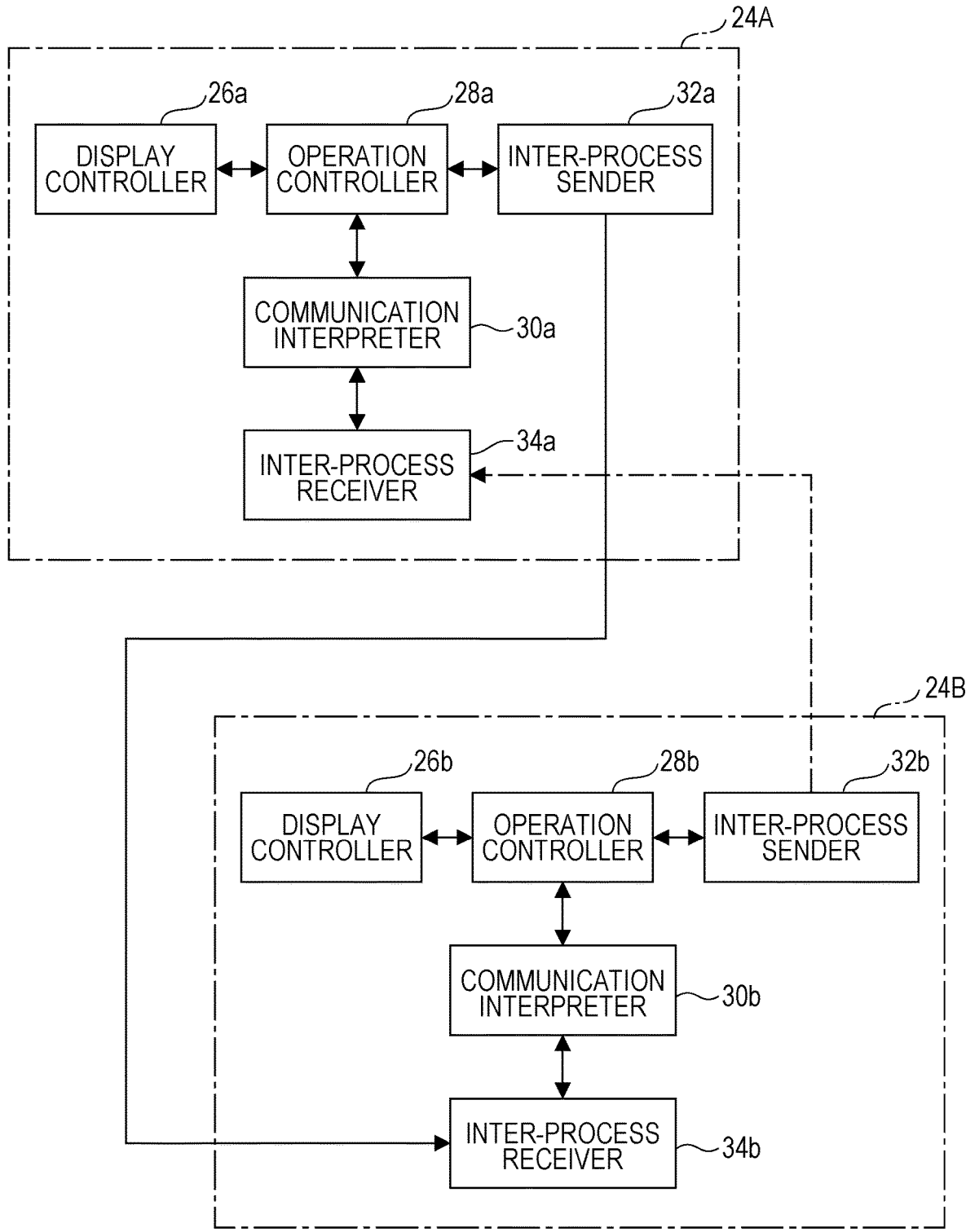
FIG. 7 illustrates the relationship between multiple viewers.

FIG. 7 illustrates the relationship between the two viewers 24A and 24B when a synchronization setting therebetween has been set.

The viewer 24A includes a display controller 26a, an operation controller 28a, a communication interpreter 30a, an inter-process sender 32a, and an inter-process receiver 34a. Likewise, the viewer 24B includes a display controller 26b, an operation controller 28b, a communication interpreter 30b, an inter-process sender 32b, and an inter-process receiver 34b. The relationship between the viewers 24A and 24B concerning a synchronization setting set by a user is retained in the operation controllers 28a and 28b as synchronization information.

It is assumed that the viewer 24A is active and a user has performed operation on the document-1 displayed by the viewer 24A. In accordance with the operation performed by the user using the operation unit 14, the operation controller 28a outputs an instruction to perform display based on the operation to the display controller 26a. The operation controller 28a also outputs the content of operation and synchronization destination information to the inter-process sender 32a based on the synchronization information. The inter-process sender 32a identifies the inter-process receiver 34b of the viewer 24B based on the synchronization destination information, and outputs the content of operation to the inter-process receiver 34b.

Upon receiving the content of operation from the viewer 24A, the inter-process receiver 34b of the viewer 24B outputs the received content of operation to the communication interpreter 30b.

The communication interpreter 30b interprets the content of operation and outputs the interpreted content of operation to the operation controller 28b.

In accordance with the interpreted content of operation, the operation controller 28b outputs an instruction to perform display based on the content of operation to the display controller 26b.

The above-described synchronize processing will be explained more specifically.

It is now assumed that a user scrolls through the document-1 by using the viewer 24A. The operation controller 28a then outputs an instruction to scroll through the document-1 in accordance with the scroll operation to the display controller 26a. The display controller 26a displays the document-1 in accordance with the scroll operation in response to the instruction from the operation controller 28a. The operation controller 28a also outputs the content of scroll operation and synchronization destination information to the inter-process sender 32a based on the synchronization information. The inter-process sender 32a identifies the inter-process receiver 34b of the viewer 24B based on the synchronization destination information, and outputs the content of scroll operation to the inter-process receiver 34b.

Upon receiving the content of scroll operation from the viewer 24A, the inter-process receiver 34b of the viewer 24B outputs it to the communication interpreter 30b.

The communication interpreter 30b interprets the content of scroll operation and outputs the interpreted content to the operation controller 28b.

In accordance with the interpreted content of scroll operation, the operation controller 28b outputs an instruction to display the document-2 in accordance with the content of scroll operation to the display controller 26b. The content of scroll operation sent from the inter-process sender 32a to the inter-process receiver 34b also indicates the amount and direction of scroll operation.

It is now assumed that a user zooms in on the document-1 displayed by the viewer 24A. The operation controller 28a then outputs an instruction to zoom in on the document-1 in accordance with zoom-in operation to the display controller 26a. The display controller 26a displays the document-1 in an enlarged size in response to the instruction from the operation controller 28a. The operation controller 28a also outputs the content of zoom-in operation and synchronization destination information to the inter-process sender 32a based on the synchronization information. The inter-process sender 32a identifies the inter-process receiver 34b of the viewer 24B based on the synchronization destination information, and outputs the content of zoom-in operation to the inter-process receiver 34b.

Upon receiving the content of zoom-in operation from the viewer 24A, the inter-process receiver 34b of the viewer 24B outputs the received content of zoom-in operation to the communication interpreter 30b.

The communication interpreter 30b interprets the content of zoom-in operation and outputs the interpreted content to the operation controller 28b.

The operation controller 28b outputs an instruction to display the document-2 in accordance with the interpreted content of zoom-in operation to the display controller 26b. The content of zoom-in operation sent from the inter-process sender 32a to the inter-process receiver 34b also indicates the magnification factor of zoom-in operation.

It is now assumed that a user performs page-turning operation on the document-1 displayed by the viewer 24A. The operation controller 28a then outputs an instruction to turn the pages of the document-1 in accordance with page-turning operation to the display controller 26a. The display controller 26a displays the document-1 in response to the page-turning instruction from the operation controller 28a. The operation controller 28a also outputs the content of page-turning operation and synchronization destination information to the inter-process sender 32a based on the synchronization information. The inter-process sender 32a identifies the inter-process receiver 34b of the viewer 24B based on the synchronization destination information, and outputs the content of page-turning operation to the inter-process receiver 34b.

Upon receiving the content of page-turning operation from the viewer 24A, the inter-process receiver 34b of the viewer 24B outputs the received content of page-turning operation to the communication interpreter 30b.

The communication interpreter 30b interprets the content of page-turning operation and outputs the interpreted content to the operation controller 28b.

The operation controller 28b outputs an instruction to display the document-2 in accordance with the interpreted content of page-turning operation to the display controller 26b. The content of page-turning operation sent from the inter-process sender 32a to the inter-process receiver 34b also includes page-turning information.

Synchronize processing executed when the viewer 24A is active and the viewer 24B is not active has been discussed with reference to FIG. 7. When the viewer 24B is active and the viewer 24A is not active, synchronize processing is executed in a similar manner. In this case, the operation controller 28b outputs the content of operation to the inter-process sender 32b, and the inter-process sender 32b outputs the content of operation to the inter-process receiver 34a. The inter-process receiver 34a outputs the received content of operation to the communication interpreter 30a. The communication interpreter 30a interprets the content of operation and outputs it to the operation controller 28a. The operation controller 28a outputs an instruction to display the document-1 in accordance with the interpreted content of operation to the display controller 26a. In FIG. 7, the long dashed dotted arrow indicates a flow of this process.

2. Synchronize Processing 2.1 Processing Forming the Basis of Exemplary Embodiment FIG. 8 is a flowchart illustrating processing forming the basis of the exemplary embodiment. In synchronize processing shown in FIG. 8, the viewer 24A is active and the viewer 24B is not active.

In step S101, the operation controller 28a judges whether a user has performed operation by using the operation unit 14.

If the user has performed operation (YES in step S101), the operation controller 28a outputs an instruction to the display controller 26a to reflect the content of operation in the viewer 24A in step S102.

The operation controller 28a then judges in step S103 whether a synchronization setting with another viewer is set.

If the user has set a synchronization setting between the document-1 displayed by the viewer 24A and the document-2 displayed by the viewer 24B (YES in step S103), the operation controller 28a outputs the content of operation to the inter-process sender 32a in step S104.

Then, in step S105, the inter-process sender 32a outputs the content of operation to the inter-process receiver 34b of the viewer 24B.

Then, in step S106, the inter-process receiver 34b outputs the received content of operation to the communication interpreter 30b.

In step S107, the communication interpreter 30b interprets the content of operation and outputs the interpreted content to the operation controller 28b.

In step S108, the operation controller 28b outputs an instruction to the display controller 26b in accordance with the content of operation. In step S109, the display controller 26b reflects the content of operation in the viewer 24B.

2.2 Page-Turning Processing

Figure 9A:
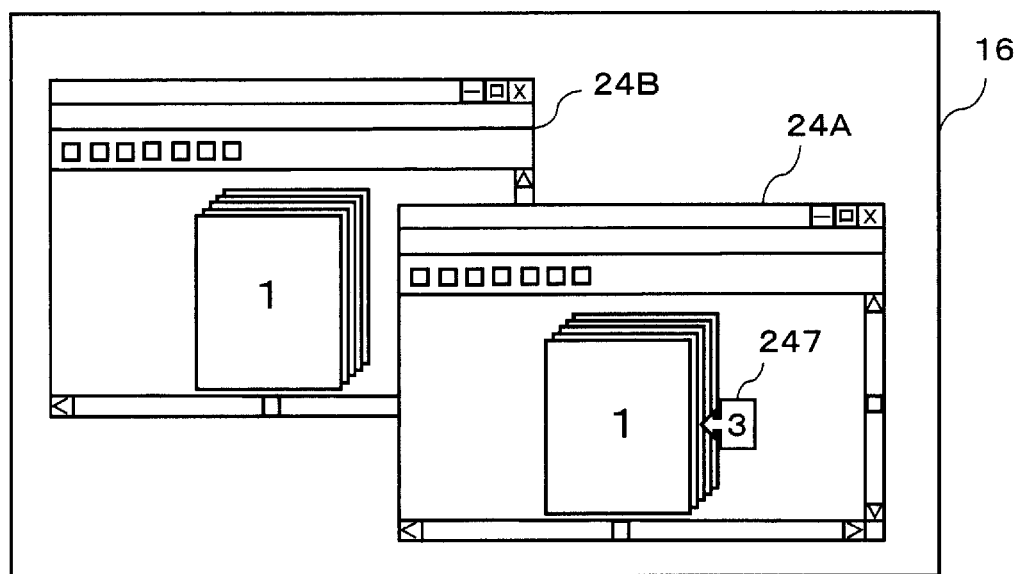
FIGS. 9A and 9B illustrate page-turning synchronize processing.
Figure 9B:
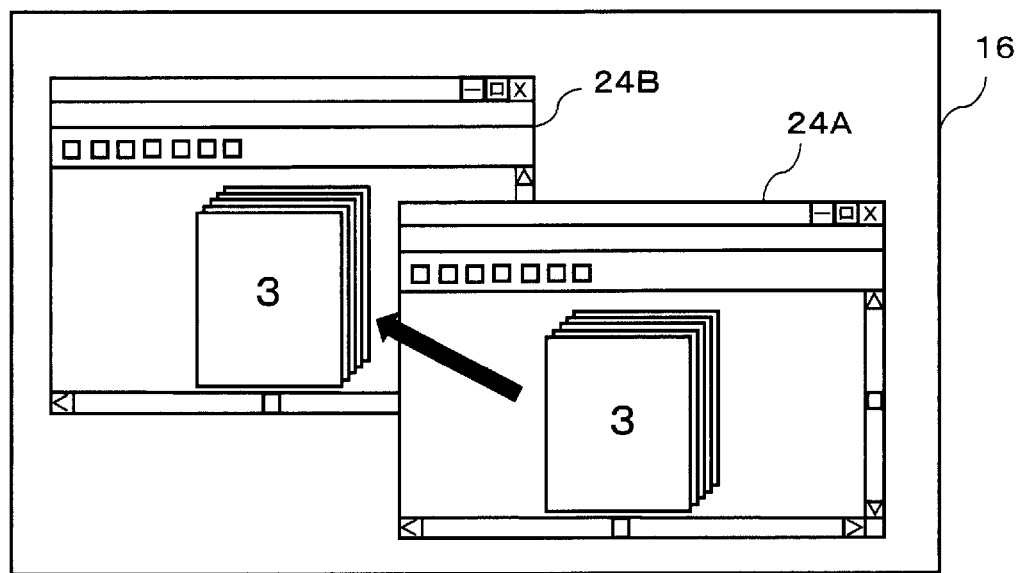

FIGS. 9A and 9B illustrate synchronize processing executed when the content of operation is page turning.

In FIG. 9A, when a user places a mouse cursor on a portion indicating the thickness of the document-1 displayed in the perspective display mode by the viewer 24A, an icon 247 indicating a page number is displayed in accordance with the position of the portion indicating the thickness of the document-1. In FIG. 9A, the first page of the document-1 is displayed at the topmost position, and also, "3" indicating the third page of the document-1 is displayed as the icon 247. The first page of the document-2 displayed in the perspective display mode by the viewer 24B is also displayed at the topmost position.

FIG. 9B illustrates an example of the screen when the user has clicked the icon 247 of the document-1 in the state shown in FIG. 9A. The operation controller 28a of the viewer 24A outputs a page-turning instruction to the display controller 26a in accordance with the operation performed on the icon 247 by the user. In response to this instruction, the display controller 26a displays the third page of the document-1 at the topmost position. The operation controller 28a also outputs the content of page-turning operation to the viewer 24B by using the inter-process sender 32a. The operation controller 28b of the viewer 24B then outputs a page-turning instruction to the display controller 26b, and in response to this instruction, the display controller 26b displays the third page of the document-2 at the topmost position. In this manner, the page-turning operation performed by using the viewer 24A is reflected in the operation by the viewer 24B, and the operation of the viewer 24A and that of the viewer 24B can be synchronized with each other. The page-turning information also indicates the page to be displayed at the topmost position of the document-2, that is, the third page. The page to be displayed at the topmost position of the document-2 is the same page of the document-1.

2.3 Scroll Processing

Figure 10A:
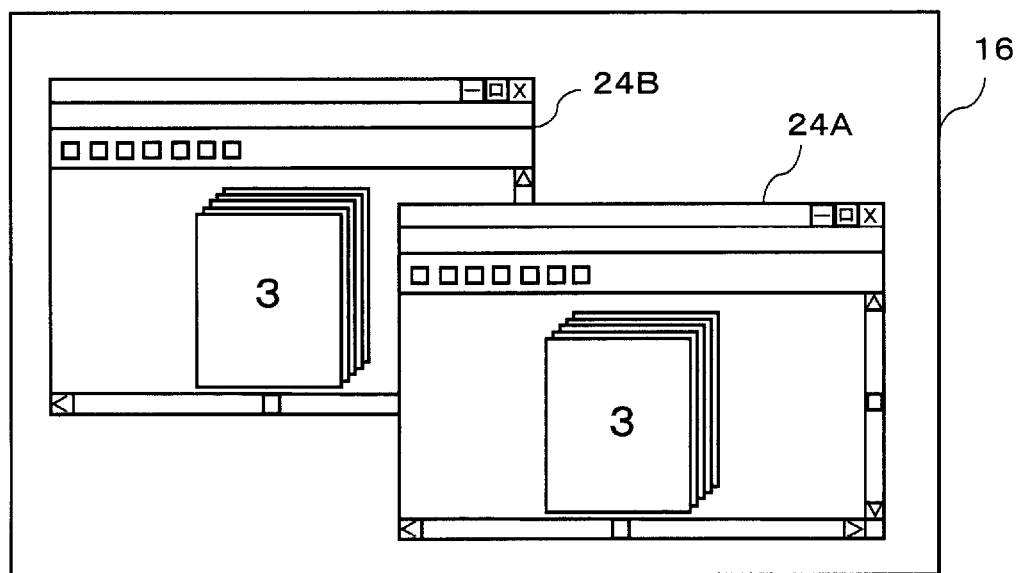
FIGS. 10A and 10B illustrate scrolling synchronize processing.
Figure 10B:
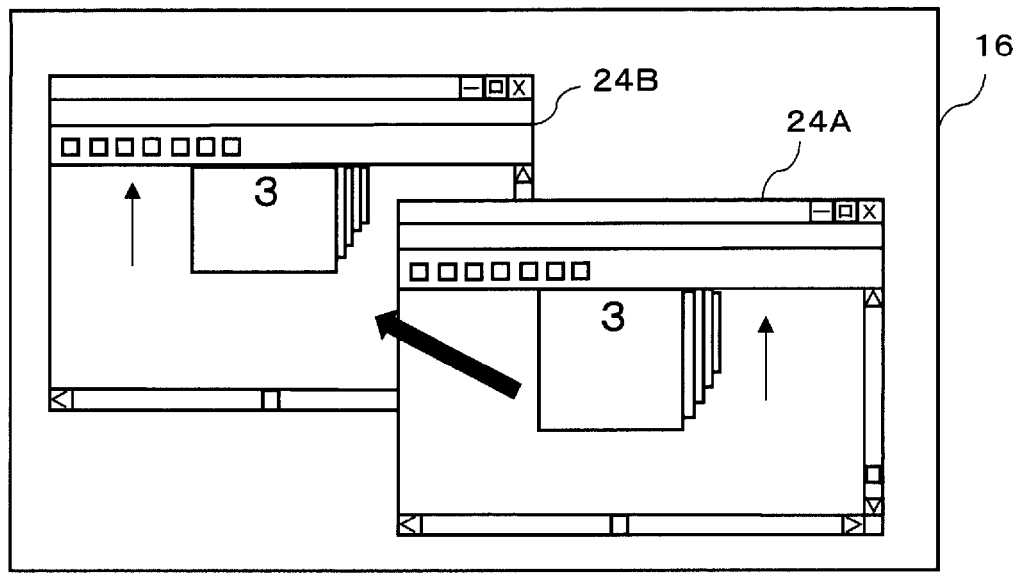

FIGS. 10A and 10B illustrate synchronize processing executed when the content of operation is scrolling.

In FIG. 10A, the third page of the document-1 is displayed at the topmost position by the viewer 24A, and the third page of the document-2 is displayed at the topmost position by the viewer 24B. In this state, a user scrolls through the document-1 displayed in the perspective display mode by the viewer 24A.

FIG. 10B illustrates an example of the screen when the user has scrolled through the document-1 in the state shown in FIG. 10A. The operation controller 28a of the viewer 24A outputs a scrolling instruction to the display controller 26a in accordance with the scroll operation performed by the user. In response to this instruction, the display controller 26a displays the document-1 through which the user has scrolled. The operation controller 28a also outputs the content of scroll operation to the viewer 24B by using the inter-process sender 32a. The operation controller 28b of the viewer 24B outputs a scrolling instruction to the display controller 26b, and in response to this instruction, the display controller 26b displays the third page of the document-2. The scrolling amount and direction for the document-2 are the same as those for the document-1. In this manner, the scroll operation performed by using the viewer 24A is reflected in the operation by the viewer 24B, and the operation of the viewer 24A and that of the viewer 24B can be synchronized with each other.

2.4 Zoom-in or Zoom-Out Processing

Figure 11A:
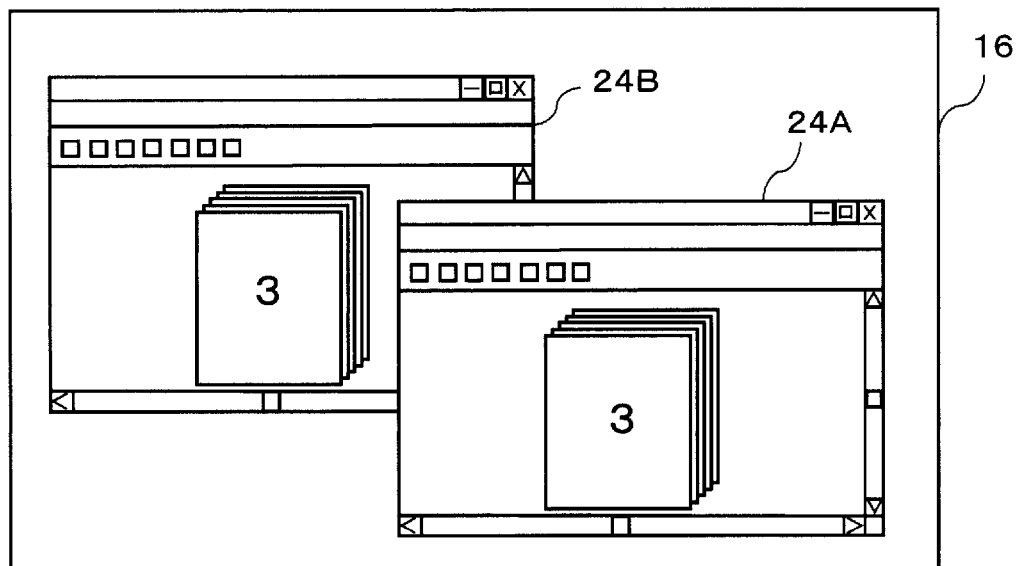
FIGS. 11A and 11B illustrate zoom-in synchronize processing.
Figure 11B:
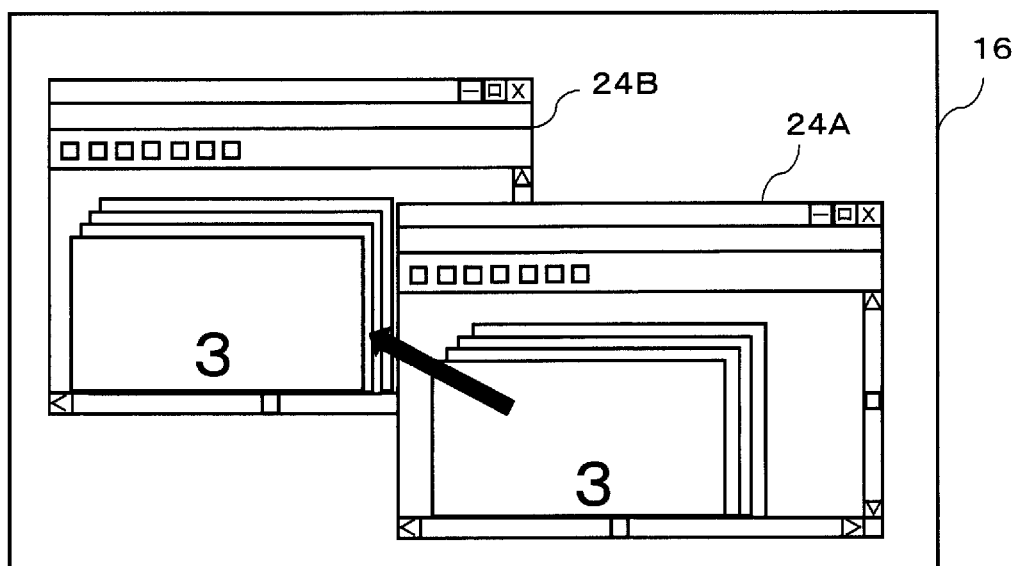

FIGS. 11A and 11B illustrate synchronize processing executed when the content of operation is zoom-in or zoom-out operation.

In FIG. 11A, the third page of the document-1 is displayed at the topmost position by the viewer 24A, and the third page of the document-2 is displayed at the topmost position by the viewer 24B. In this state, the user changes the magnification factor for the document-1 displayed in the perspective display mode by the viewer 24A and performs zoom-in operation, for example.

FIG. 11B illustrates an example of the screen when the user has zoomed in on the document-1 in the state shown in FIG. 11A. The operation controller 28a of the viewer 24A outputs a zoom-in instruction to the display controller 26a in accordance with the zoom-in operation performed by the user. In response to this instruction, the display controller 26a displays the zoomed-in document-1. The operation controller 28a also outputs the content of zoom-in operation to the viewer 24B by using the inter-process sender 32a. The operation controller 28b of the viewer 24B outputs a zoom-in instruction to the display controller 26b, and in response to this instruction, the display controller 26b displays the third page of the document-2 zoomed in with the same magnification factor. In this manner, the zoom-in or zoom-out operation performed by using the viewer 24A is reflected in that by the viewer 24B, and the operation of the viewer 24A and that of the viewer 24B can be synchronized with each other.

3. Synchronization Cancel Processing

Synchronizing the operation of the viewer 24A and that of the viewer 24B with each other may enhance the user operability. Conversely, such synchronize operation may decrease the user operability in some cases.

One example of such cases is that a user has minimized the size of the document-2 displayed by the viewer 24B. In this case, if the operation of the viewer 24A is synchronized with that of the viewer 24B, operation performed by the viewer 24A, such as page-turning operation or zoom-in or zoom-out operation, is automatically reflected in the document-2 although the user does not intend to use the document-2.

Another example is that a user has reduced the display area of the document-2 displayed by the viewer 24B by changing the size of the document-2 or by shifting the position of the document-2 to one side of the viewer 24B. In this manner, when the display area of the document-2 is reduced to a certain threshold or smaller, if the operation of the viewer 24A is synchronized with that of the viewer 24B, operation performed by the viewer 24A, such as page-turning operation or zoom-in or zoom-out operation, is automatically reflected in the document-2 although the user does not intend to use the document-2. When the viewer 24B is located at the back of the viewer 24A and the document-2 is hidden behind the document-1, synchronize operation may also decrease the user operability.

To deal with such a situation, in this exemplary embodiment, a synchronization setting between the viewers 24A and 24B is temporarily canceled, so that one viewer can perform operation independently without influencing operation by the other viewer.

3.1 Page-turning Processing when Document Size is Minimized

Figure 12A:
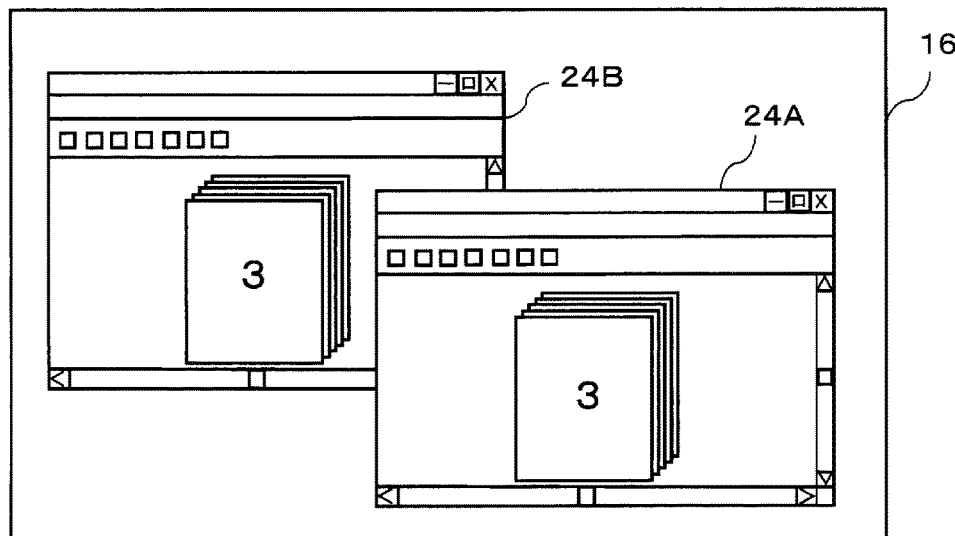
FIGS. 12A through 13C illustrate examples of synchronization cancel processing when the document size is minimized.

FIG. 12A illustrates a state in which the third page of the document-1 is displayed at the topmost position of the viewer 24A, while the third page of the document-2 is displayed at the topmost position of the viewer 24B. In this state, a user minimizes the size of the document-2 by operating a specific icon, for example.

Figure 12B:
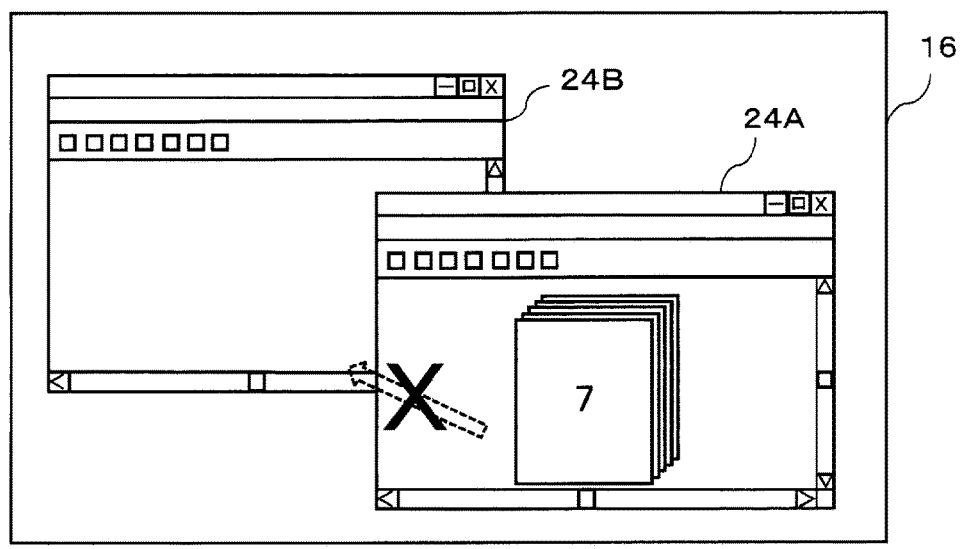

FIG. 12B illustrates a state in which the size of the document-2 is minimized. In this state, the user clicks an icon displayed on a portion indicating the thickness of the document-1, such as the icon 247 shown in FIG. 9A, to perform page-turning operation on the document-1. Then, the seventh page of the document-1, for example, is displayed at the topmost position of the viewer 24A.

If the size of the document-2 is not minimized but is the normal size, the operation of the viewer 24A is synchronized with that of the viewer 24B and page-turning operation is also performed on the document-2 in the viewer 24B, as shown in FIG. 9B. However, since the size of the document-2 is minimized in the viewer 24B, a synchronization setting between the viewers 24A and 24B is canceled and page-turning operation is not performed in the viewer 24B. In FIG. 12B, the cross mark (X) indicates that a synchronization setting between the viewers 24A and 24B is canceled. The operation controller 28b receives the content of operation (page-turning operation) performed by the viewer 24A from the communication interpreter 30b, but upon detecting that the size of the document-2 is minimized, it disables the content of operation and cancels a synchronization setting with the viewer 24A without outputting a page-turning instruction to the display controller 26b.

Figure 12C:
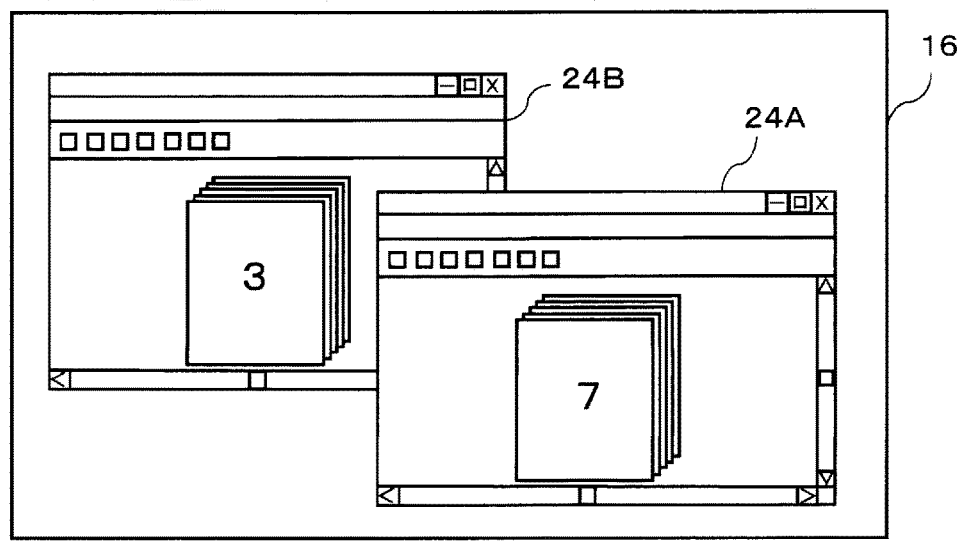

When the user returns the size of the document-2 to the normal size in the state in FIG. 12B, the document-2 is still maintained in the previous state in which the third page is displayed at the topmost position (state in FIG. 12A), as shown in FIG. 12C. If a synchronization setting with the viewer 24A were maintained, the seventh page of the document-2 would be displayed at the topmost position of the viewer 24B.

When the user performs page-turning operation on the document-1 by using the viewer 24A in the state in FIG. 12C, synchronizing between the viewers 24A and 24B restarts because the size of the document-2 is no longer minimized. Upon detecting that the size of the document-2 is not minimized, the operation controller 28b receives the content of operation (page-turning operation) performed by the viewer 24A from the communication interpreter 30b and outputs an instruction to the display controller 26b in accordance with the content of operation. At this time, the user does not need to set a synchronization setting again, such as that shown in FIGS. 5 and 6.

3.2 Zoom-In or Zoom-Out Processing when Document Size is Minimized

Figure 13A:
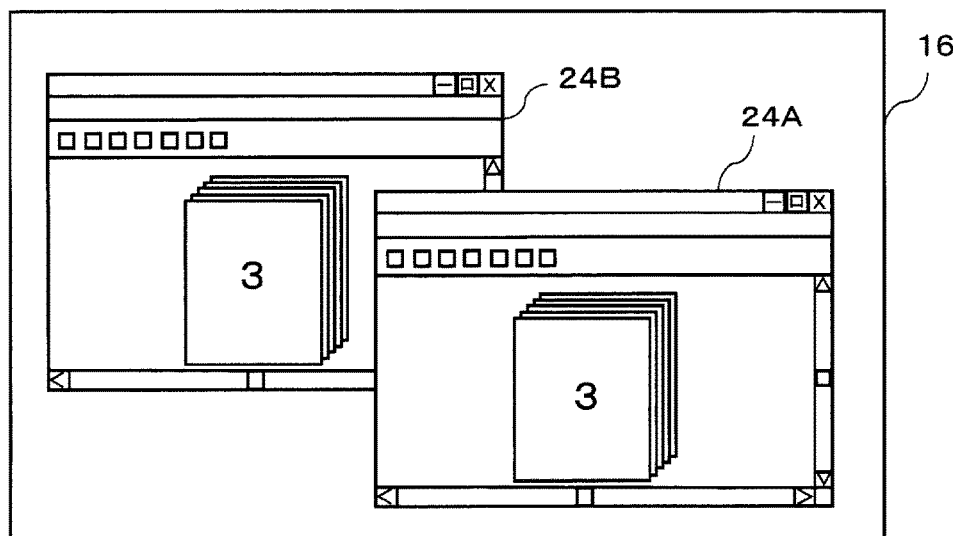

FIG. 13A illustrates a state in which the third page of the document-1 is displayed at the topmost position of the viewer 24A, while the third page of the document-2 is displayed at the topmost position of the viewer 24B. In this state, a user minimizes the size of the document-2.

Figure 13B:
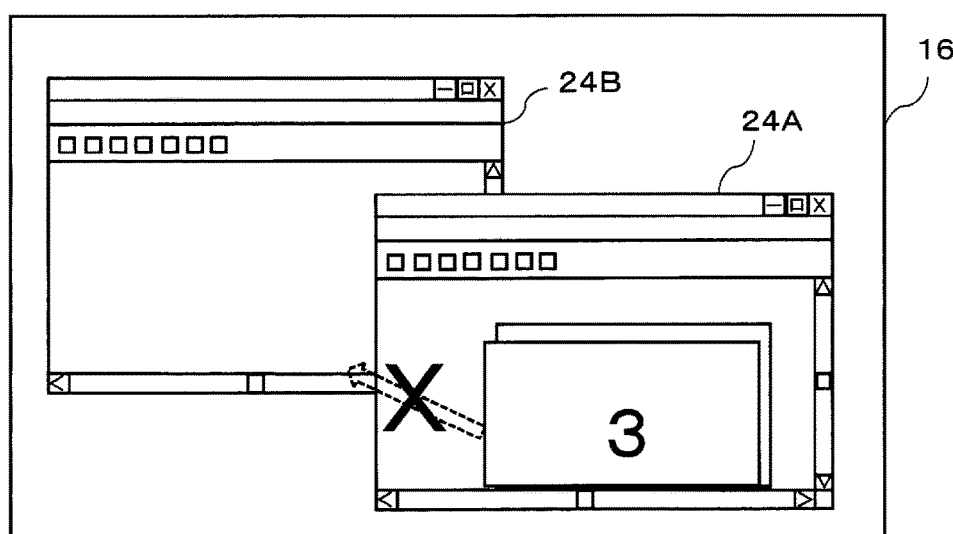

FIG. 13B illustrates a state in which the size of the document-2 is minimized. In this state, the user zooms in on the document-1 by using the viewer 24A.

In this case, if the size of the document-2 is not minimized but is the normal size, the operation of the viewer 24A is synchronized with that of the viewer 24B and zoom-in operation is also performed on the document-2, as shown in FIG. 11B. However, since the size of the document-2 is minimized in the viewer 24B, a synchronization setting between the viewers 24A and 24B is canceled and zoom-in operation is not performed in the viewer 24B. In FIG. 13B, the cross mark (X) indicates that a synchronization setting between the viewers 24A and 24B is canceled. The operation controller 28b receives the content of operation (zoom-in operation) performed by the viewer 24A from the communication interpreter 30b, but upon detecting that the size of the document-2 is minimized, it disables the content of operation and cancels a synchronization setting with the viewer 24A without outputting a zoom-in instruction to the display controller 26b.

Figure 13C:
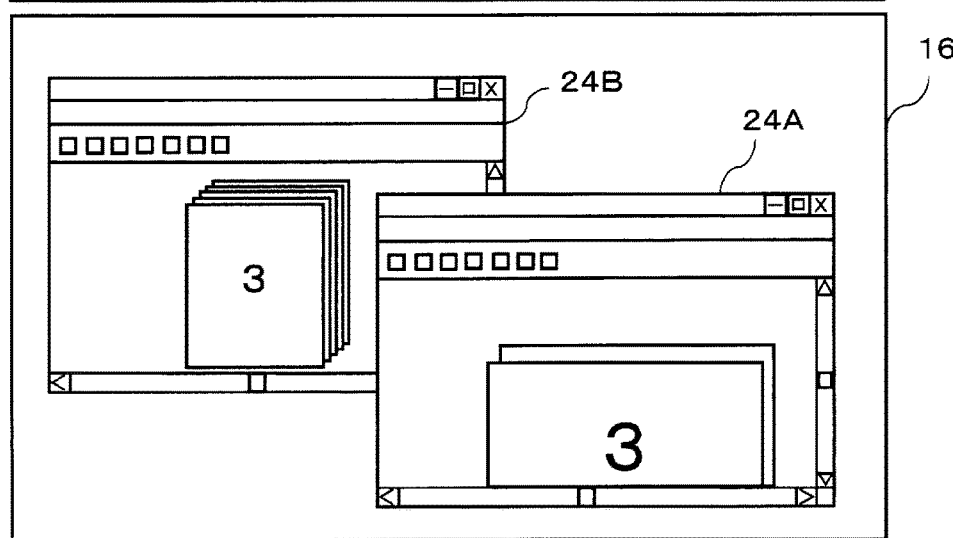

When the user returns the size of the document-2 to the normal size in the state in FIG. 13B, the document-2 is still maintained in the previous state in which the document-2 is displayed with the same size as that in FIG. 13A, as shown in FIG. 13C.

When the user performs zoom-in operation on the document-1 by using the viewer 24A in the state in FIG. 13C, synchronizing between the viewers 24A and 24B restarts because the size of the document-2 is no longer minimized. Upon detecting that the size of the document-2 is not minimized, the operation controller 28b receives the content of operation (zoom-in operation) performed by the viewer 24A from the communication interpreter 30b and outputs an instruction to the display controller 26b in accordance with the content of operation. At this time, the user does not need to set a synchronization setting again, such as that shown in FIGS. 5 and 6.

Likewise, when the user performs scroll operation on the document-1 by using the viewer 24A, if the size of the document-2 is minimized, scroll operation is not performed in the viewer 24B.

Figure 14A:
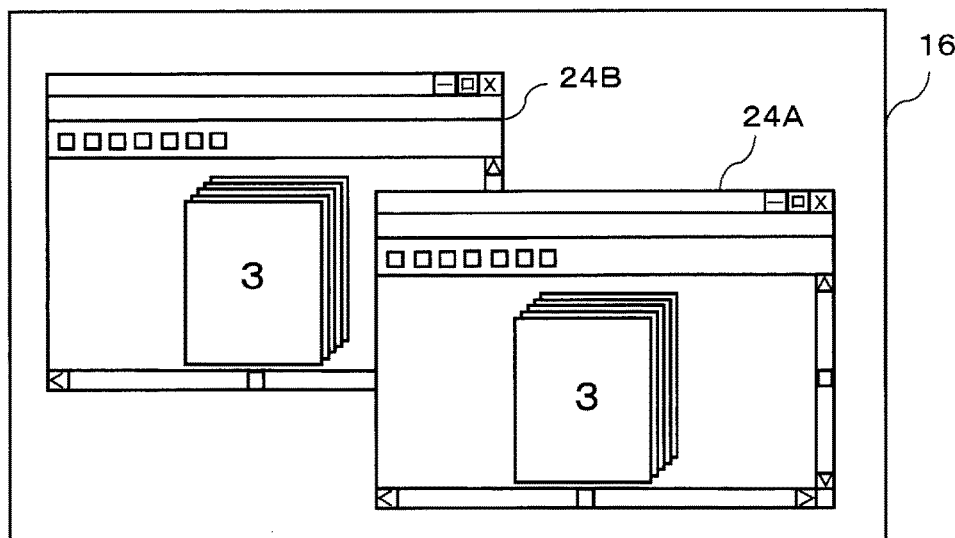
FIGS. 14A through 15C illustrate examples of synchronization cancel processing when the display area is equal to or smaller than a threshold.

3.3 Page-Turning Processing when Display Area is Equal to or Smaller than Threshold FIG. 14A illustrates a state in which the third page of the document-1 is displayed at the topmost position of the viewer 24A, while the third page of the document-2 is displayed at the topmost position of the viewer 24B. In this state, a user reduces the display area of the document-2 by shifting it to one side of the viewer 24B.

Figure 14B:
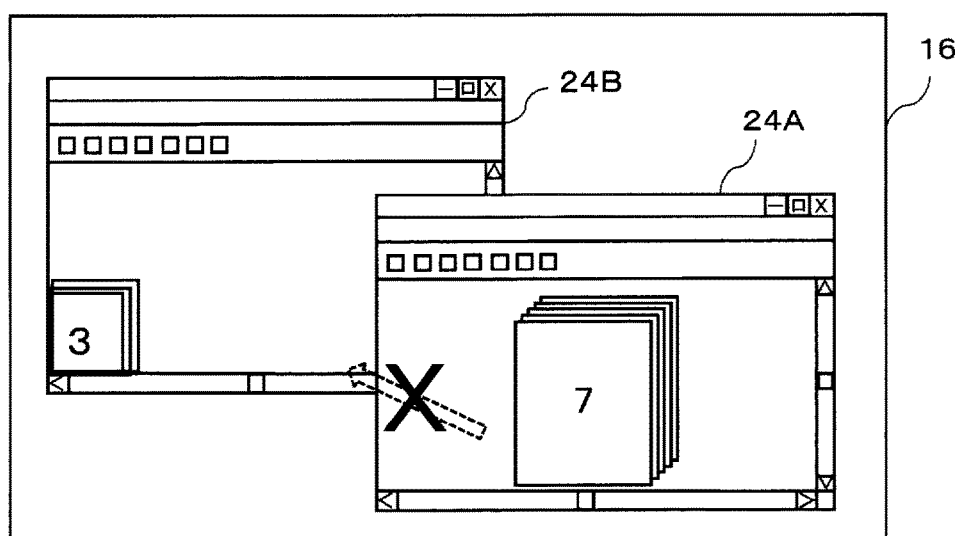

FIG. 14B illustrates a state in which the display area of the document-2 is reduced. In this state, the user clicks an icon displayed on a portion indicating the thickness of the document-1, such as the icon 247 shown in FIG. 9A, to perform page-turning operation on the document-1. Then, the seventh page of the document-1, for example, is displayed at the topmost position of the viewer 24A.

In this case, if the display area of the document-2 exceeds a certain threshold, the operation of the viewer 24A is synchronized with that of the viewer 24B and page-turning operation is also performed on the document-2, as shown in FIG. 9B. However, since the display area of the document-2 is reduced to reach the threshold or smaller in the viewer 24B, a synchronization setting between the viewers 24A and 24B is canceled and page-turning operation is not performed in the viewer 24B. In FIG. 14B, the cross mark (X) indicates that a synchronization setting between the viewers 24A and 24B is canceled. The operation controller 28b receives the content of operation (page-turning operation) performed by the viewer 24A from the communication interpreter 30b, but upon detecting that the display area of the document-2 is reduced to reach the threshold or smaller, it disables the content of operation and cancels a synchronization setting with the viewer 24A without outputting a page-turning instruction to the display controller 26b. The threshold may be about 30 to 50% of the area for one page of the document-2. However, this is only an example. The threshold may be retained in the operation controller 28b as a default or may be adjustable by a user to a suitable value.

Figure 14C:
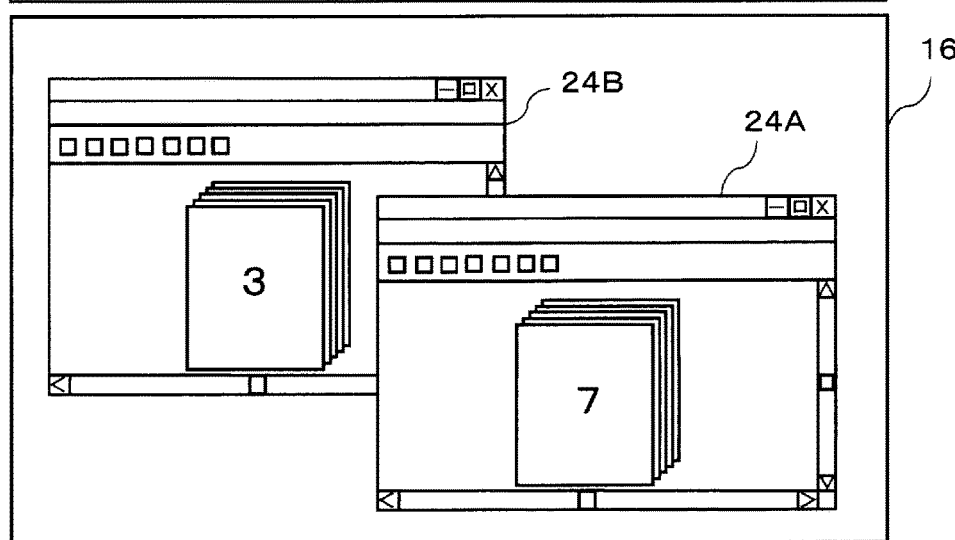

When the user returns the display area of the document-2 to the normal size in the state in FIG. 14B, the document-2 is still maintained in the previous state in which the third page is displayed at the topmost position (state in FIG. 14A), as shown in FIG. 14C.

When the user performs page-turning operation on the document-1 by using the viewer 24A in the state in FIG. 14C, synchronizing between the viewers 24A and 24B restarts because the display area of the document-2 exceeds the threshold. Upon detecting that the display area of the document-2 exceeds the threshold, the operation controller 28b receives the content of operation (page-turning operation) performed by the viewer 24A from the communication interpreter 30b and outputs a page-turning instruction to the display controller 26b in accordance with the content of operation.

3.4 Scroll Processing when Display Area is Equal to or Smaller than Threshold

Figure 15A:
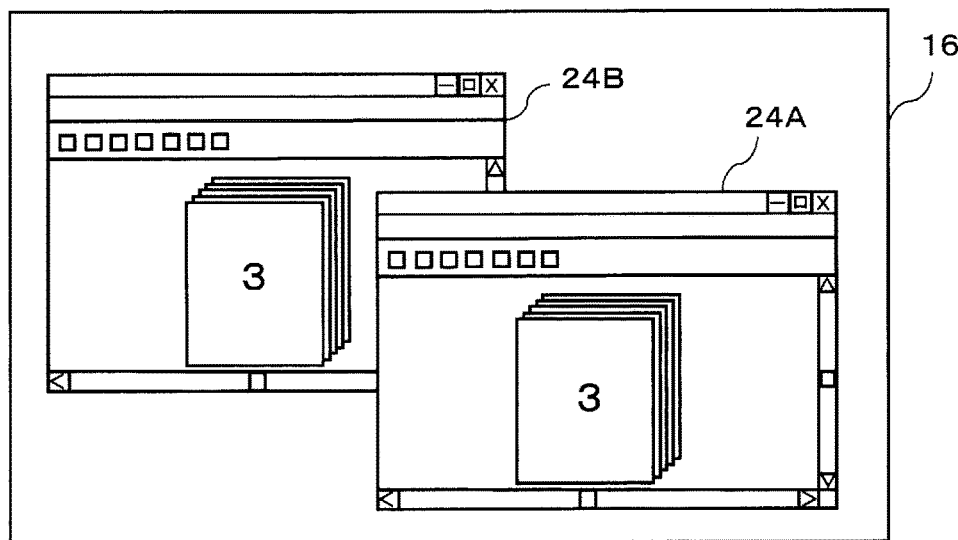

FIG. 15A illustrates a state in which the third page of the document-1 is displayed at the topmost position of the viewer 24A, while the third page of the document-2 is displayed at the topmost position of the viewer 24B. In this state, a user reduces the display area of the document-2 by shifting it to one side of the viewer 24B.

Figure 15B:
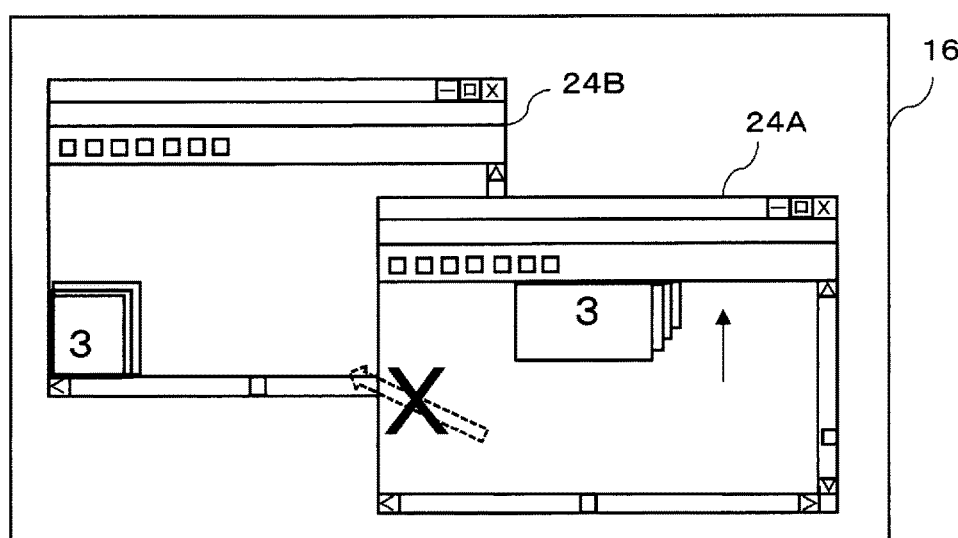

FIG. 15B illustrates a state in which the display area of the document-2 is reduced. In this state, the user performs scroll operation on the document-1 by using the viewer 24A.

In this case, if the display area of the document-2 exceeds a certain threshold, the operation of the viewer 24A is synchronized with that of the viewer 24B and scroll operation is also performed on the document-2, as shown in FIG. 10B. However, since the display area of the document-2 is reduced to reach the threshold or smaller in the viewer 24B, a synchronization setting between the viewers 24A and 24B is canceled and scroll operation is not performed in the viewer 24B. In FIG. 15B, the cross mark (X) indicates that a synchronization setting between the viewers 24A and 24B is canceled. The operation controller 28b receives the content of operation (scroll operation) performed by the viewer 24A from the communication interpreter 30b, but upon detecting that the display area of the document-2 is reduced to reach the threshold or smaller, it disables the content of operation and cancels a synchronization setting with the viewer 24A without outputting a scrolling instruction to the display controller 26b.

Figure 15C:
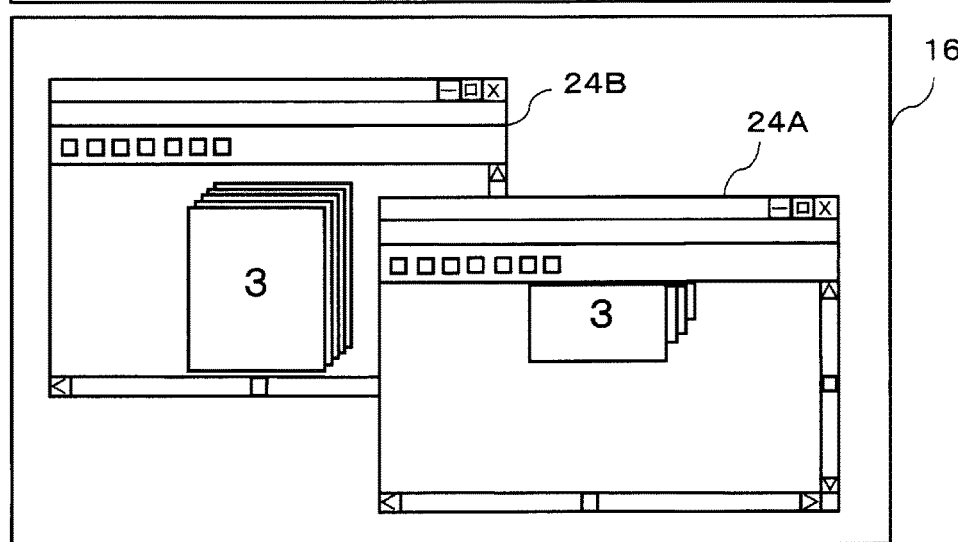

When the user returns the display area of the document-2 to the normal size in the state in FIG. 15B, the document-2 is still maintained in the previous state in FIG. 15A, as shown in FIG. 15C.

When the user performs scroll operation on the document-1 by using the viewer 24A in the state in FIG. 15C, synchronizing between the viewers 24A and 24B restarts because the display area of the document-2 exceeds the threshold. Upon detecting that the display area of the document-2 exceeds the threshold, the operation controller 28b receives the content of operation (scroll operation) performed by the viewer 24A from the communication interpreter 30b and outputs a scrolling instruction to the display controller 26b in accordance with the content of operation.

Likewise, when the user performs zoom-in or zoom-out operation on the document-1 by using the viewer 24A, if the display area of the document-2 is equal to or smaller than a threshold, zoom-in or zoom-out operation is not performed in the viewer 24B.

3.5 Page-Turning Processing when Viewer is Located Behind Another Viewer

Figure 16A:
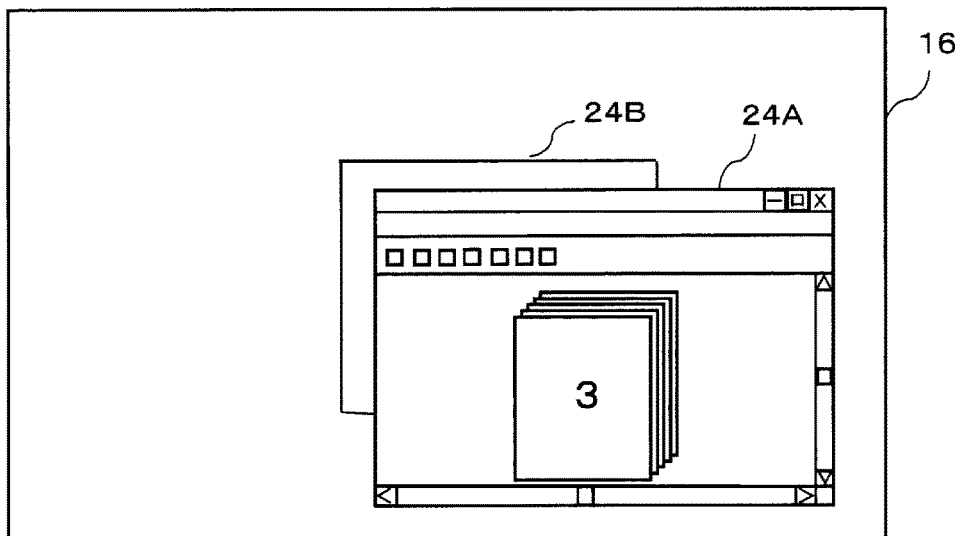
FIGS. 16A through 16C illustrate an example of synchronization cancel processing when one viewer is located behind the other viewer.

FIG. 16A illustrates a state in which the third page of the document-1 is displayed at the topmost position of the viewer 24A, while the third page of the document-2 is displayed at the topmost position of the viewer 24B. In this case, the viewer 24B is located behind the viewer 24A.

In the state shown in FIG. 16A, the user clicks an icon displayed on a portion indicating the thickness of the document-1, such as the icon 247 shown in FIG. 9A, to perform page-turning operation on the document-1. Then, the seventh page of the document-1, for example, is displayed at the topmost position of the viewer 24A, as shown in FIG. 16B.

In this case, if the viewers 24A and 24B are displayed side by side, the operation of the viewer 24A is synchronized with that of the viewer 24B and page-turning operation is also performed on the document-2, as shown in FIG. 9B. However, since the viewer 24B is hidden behind the viewer 24A, a synchronization setting between the viewers 24A and 24B is canceled and page-turning operation is not performed in the viewer 24B. In FIG. 16B, the cross mark (X) indicates that a synchronization setting between the viewers 24A and 24B is canceled. The operation controller 28b receives the content of operation (page-turning operation) performed by the viewer 24A from the communication interpreter 30b, but upon detecting that the viewer 24B is located behind the viewer 24A, it disables the content of operation and cancels a synchronization setting with the viewer 24A without outputting a page-turning instruction to the display controller 26b.

Figure 16B:
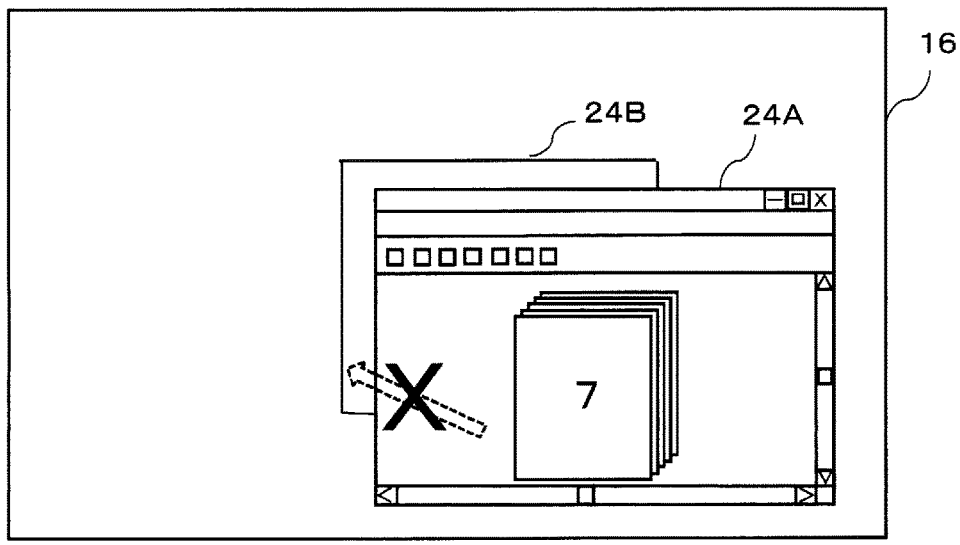
Figure 16C:
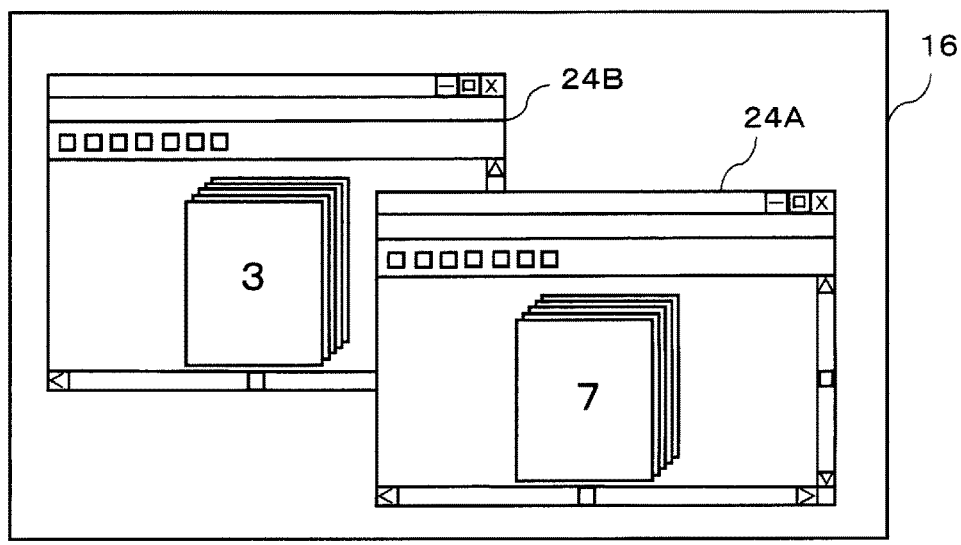

When the user changes the position of the viewer 24B in the state in FIG. 16B such that the viewers 24A and 24B are displayed side by side, the document-2 is still maintained in the previous state in which the third page is displayed at the topmost position, as shown in FIG. 16C.

When the user performs page-turning operation on the document-1 by using the viewer 24A in the state in FIG. 16C, synchronizing between the viewers 24A and 24B restarts because the viewer 24B is no longer located behind the viewer 24A. Upon detecting that the viewer 24B is not located behind the viewer 24A, the operation controller 28b receives the content of operation (page-turning operation) performed by the viewer 24A from the communication interpreter 30b and outputs a page-turning instruction to the display controller 26b in accordance with the content of operation. Regarding whether the viewer 24B is located behind the viewer 24A, the operation controller 28b may judge whether the viewer 24B is positioned behind (or at the back of) the viewer 24A and whether the degree by which the viewers 24A and 24B overlap each other is equal to or greater than a threshold (70%, for example). Even if part of the viewer 24B is located behind the viewer 24A, if the degree by which the viewers 24A and 24B overlap each other is smaller than the threshold and the major part of the viewer 24B is seen, as shown in FIG. 16C, the synchronization state is maintained. Likewise, even if part of the viewer 24B is located behind the viewer 24A, if the display area of the document-2 exceeds a threshold, the synchronization state is maintained.

3.6 Processing Flowchart

Figure 17:
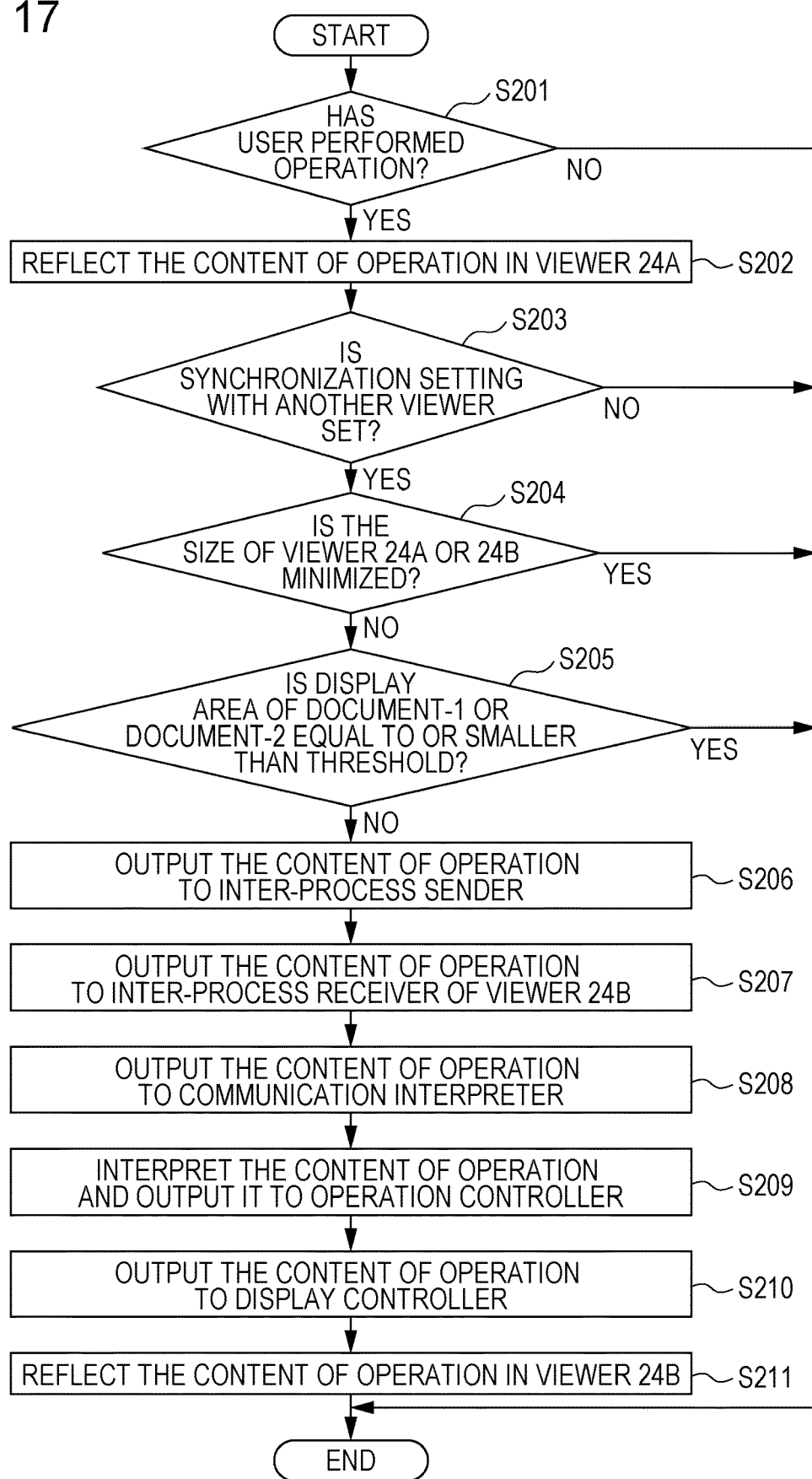
FIG. 17 is a flowchart illustrating processing according to the exemplary embodiment.

FIG. 17 is a flowchart illustrating processing according to the exemplary embodiment.

In step S201, the operation controller 28a judges whether a user has performed operation by using the operation unit 14.

If the user has performed operation (YES in step S201), the operation controller 28a outputs an instruction to the display controller 26a to reflect the content of operation in the viewer 24A in step S202.

The operation controller 28a then judges in step S203 whether a synchronization setting with another viewer is set. If a synchronization setting with another viewer is not set (NO in step S203), the viewers 24A and 24B are operated independently of each other.

If the user has set a synchronization setting between the document-1 displayed by the viewer 24A and the document-2 displayed by the viewer 24B (YES in step S203), the operation controller 28a judges in step S204 whether the size of one of the viewers 24A and 24B is minimized. If the size of one of the viewers 24A and 24B is minimized (YES in step S204), the operation controller 28a cancels a synchronization setting which is found to be set in step S203 so as to operate the viewers 24A and 24B independently.

If neither of the size of the viewer 24A nor that of the viewer 24B is minimized (NO in step S204), the operation controller 28a judges in step S205 whether the display area of the document-1 or the document-2 is equal to or smaller than a certain threshold. If the display area of the document-1 or the document-2 is equal to or smaller than the threshold (YES in step S205), the operation controller 28a cancels a synchronization setting which is found to be set in step S203 so as to operate the viewers 24A and 24B independently.

If the display areas of both of the document-1 and the document-2 are greater than the threshold (NO in step S205), the operation controller 28a outputs the content of operation to the inter-process sender 32a in step S206.

Then, in step S207, the inter-process sender 32a outputs the content of operation to the inter-process receiver 34b of the viewer 24B.

Then, in step S208, the inter-process receiver 34b outputs the received content of operation to the communication interpreter 30b.

In step S209, the communication interpreter 30b interprets the content of operation and outputs the interpreted content to the operation controller 28b.

In step S210, the operation controller 28b outputs an instruction to the display controller 26b in accordance with the content of operation. In step S211, the display controller 26b reflects the content of operation in the viewer 24B.

The exemplary embodiment has been discussed above. However, the invention is not restricted to this exemplary embodiment, and various modifications may be made. Some modified examples will be described below.

First Modified Example

In the exemplary embodiment, the two viewers 24A and 24B are synchronized with each other. FIG. 6 shows that, however, three or more documents displayed by three or more viewers may be synchronized with one another. In this case, if at least one of the three or more synchronized documents is not being used, a synchronization setting with the viewer displaying this document is canceled.

It is now assumed that document-1, document-2, document-3, and document-4 are displayed by viewers 24. If document-1, document-2, and document-3 are synchronized with one another and if document-3 is not being used, such as if the size of document-3 is minimized, a synchronization setting with document-3 is canceled, and synchronization between document-1 and document-2 is maintained. That is, if a user performs page-turning operation on document-1, page-turning operation is also performed on document-2 but is not performed on document-3.

Second Modified Example

In the exemplary embodiment, when the document-1 is displayed in the perspective display mode by the viewer 24A and the document-2 is displayed in the perspective display mode by the viewer 24B, the viewers 24A and 24B are synchronized with each other. However, when the document-1 is displayed in the continuous display mode by the viewer 24A and the document-2 is displayed in the continuous display mode by the viewer 24B, the viewers 24A and 24B may be synchronized with each other. Alternatively, when the document-1 is displayed in the perspective display mode by the viewer 24A and the document-2 is displayed in the continuous display mode by the viewer 24B, the viewers 24A and 24B may be synchronized with each other. In such cases, too, when one of the viewers 24A and 24B is not being used, a synchronization setting between the viewers 24A and 24B is canceled.

Third Modified Example

In the exemplary embodiment, if the viewer 24A is not being used, for example, the operation controller 28a cancels a synchronization setting with the viewer 24B by not outputting the content of operation to the operation controller 28*b* via the inter-process sender 32*a* and the inter-process receiver 34*b*. Alternatively, a synchronization setting between the viewers 24A and 24B may be canceled in the following manner. The operation controller 28*a* outputs the content of operation to the operation controller 28*b* via the inter-process sender 32*a* and the inter-process receiver 34*b*, but the operation controller 28*b* does not output the content of operation to the display controller 26*b* if it has received information from the operation controller 28*a* that the viewer 24A is not being used, such as that the size of the viewer 24A is minimized.

Fourth Modified Example

In the exemplary embodiment, when one of the viewers 24A and 24B is not being used, a synchronization setting between the viewers 24A and 24B is canceled. Examples of a state in which one of the viewers 24A and 24B is not being used are that the size of one of the viewers 24A and 24B is minimized and that the display area of a document displayed by one of the viewers 24A and 24B is equal to or smaller than a certain threshold. However, these are only examples. Upon detecting another state in which a viewer or a document is not being used, a synchronization setting may also be canceled. For example, even when the size of a viewer is not minimized and the display area of a document displayed by the viewer exceeds a certain threshold, if no operation has been performed on the document for a certain time, a synchronization setting may also be canceled.

Fifth Modified Example

In the exemplary embodiment, when one of the viewers 24A and 24B is not being used, a synchronization setting between the viewers 24A and 24B is canceled. Information indicating whether a synchronization setting is set or canceled may be displayed at a predetermined position of the display 16 so that a user can visually check whether a synchronization setting is set or canceled. For example, synchronized viewers may be displayed in the same color, and when a synchronization setting therebetween is canceled, the viewers may be displayed in different colors. When a synchronization setting is canceled, a popup message, such as "a synchronization setting is temporarily canceled", may be displayed.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a display that displays a first document in a first window and also displays a second document in a second window;
a setter that sets a synchronization setting between the first and second documents; and
a synchronization controller that executes an operation performed on one of the first and second documents also on the other one of the first and second documents when a synchronization setting is set by the setter and that cancels the synchronization setting when one of the first and second documents is in a first state in which the corresponding one of the first and second documents is not being used and restarts the synchronization setting when the corresponding one of the first and second documents is changed from the first state to a second state in which the corresponding one of the first and second documents is being used.

2. The information processing apparatus according to claim 1, wherein the first state is a state in which a size of one of the first and second documents is minimized.

3. The information processing apparatus according to claim 1, wherein the first state is a state in which a display area of one of the first and second documents is equal to or smaller than a threshold.

4. The information processing apparatus according to claim 1, wherein the first state is a state in which one of the first and second documents is positioned behind the other one of the first and second documents.

5. The information processing apparatus according to claim 1, wherein the operation is at least one of a scroll operation, a zoom-in or zoom-out operation, and a page-turning operation.

6. The information processing apparatus according to claim 1, wherein the first and second documents are displayed in a perspective display mode.

7. The information processing apparatus according to claim 1, wherein the first and second documents are displayed in a continuous display mode.

8. The information processing apparatus according to claim 1, wherein the first document is displayed in a perspective display mode and the second document is displayed in a continuous display mode.

9. The information processing apparatus according to claim 1, wherein the synchronization controller displays information indicating whether a synchronization setting is set or canceled.

10. A non-transitory computer readable medium storing a program causing a computer to execute a process, the process comprising:
displaying a first document in a first window and also displaying a second document in a second window;
setting a synchronization setting between the first and second documents; and
executing an operation performed on one of the first and second documents also on the other one of the first and second documents when a synchronization setting is set, and canceling the synchronization setting when one of the first and second documents is in a first state in which the corresponding one of the first and second documents is not being used and restarting the synchronization setting when the corresponding one of the first and second documents is changed from the first state to a second state in which the corresponding one of the first and second documents is being used.

11. An information processing apparatus comprising:
display means for displaying a first document in a first window and also displaying a second document in a second window;
setting means for setting a synchronization setting between the first and second documents; and
synchronization control means for executing an operation performed on one of the first and second documents also on the other one of the first and second documents when a synchronization setting is set by the setting means and for canceling the synchronization setting when one of the first and second documents is in a first state in which the corresponding one of the first and second documents is not being used and restarting the synchronization setting when the corresponding one of the first and second documents is changed from the first state to a second state in which the corresponding one of the first and second documents is being used.

\* \* \* \* \*